No. 759,040. PATENTED MAY 3, 1904.
M. M. STAHL.
MIRROR ATTACHMENT FOR PIANOS.
APPLICATION FILED MAY 11, 1903.
NO MODEL.
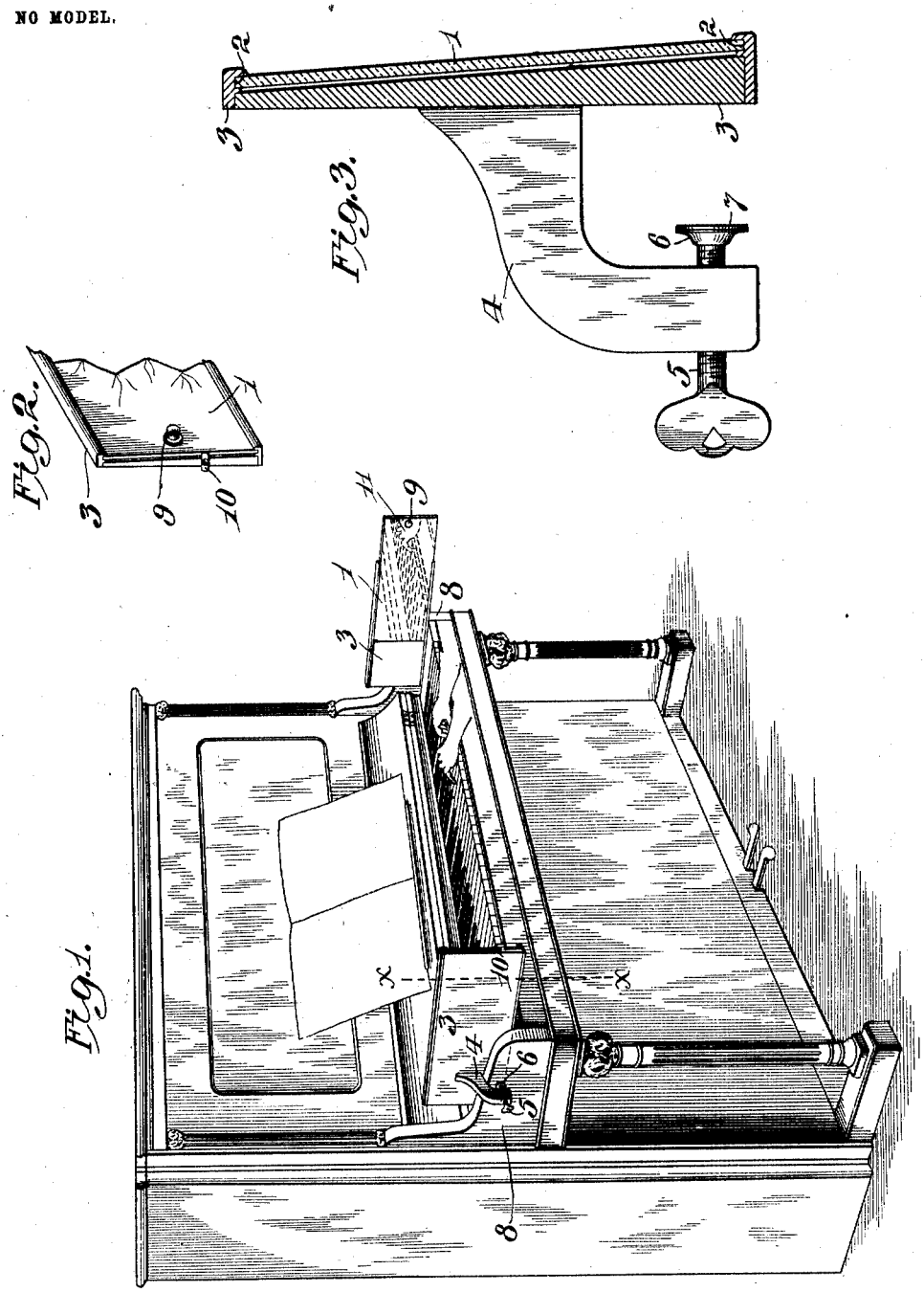

No. 759,040.

Patented May 3, 1904.

UNITED STATES PATENT OFFICE.

MARION MÜHLENBRUCH STAHL, OF TARRYTOWN, NEW YORK.

MIRROR ATTACHMENT FOR PIANOS.

SPECIFICATION forming part of Letters Patent No. 759,040, dated May 3, 1904.

Application filed May 11, 1903. Serial No. 156,708. (No model.)

*To all whom it may concern:*

Be it known that I, MARION MÜHLENBRUCH STAHL, a citizen of the United States of America, residing at the village of Tarrytown, county of Westchester, and State of New York, have invented certain new and useful Improvements in Mirror Attachments for Pianos, of which the following is a specification.

This invention has for its more special object to provide a simple and practical mirror attachment for pianos which will reflect the movements and positions of the performer's hands and forearms, and thus aid in avoiding awkward, unnecessary, and tiresome motions and materially assist in acquiring graceful, correct, and labor-saving movements and positions of the hands and forearms of the player.

The invention comprises an arrangement of mirrors which are by preference easily attachable to and removable from a piano-case and when in use reflect the piano-keyboard and the movements thereover of the hands and forearms of the player.

The invention also includes an adjustable arrangement of the mirrors, permitting them to be moved backward and forward to facilitate observation by reflection of the hands and forearms of both adult and juvenile performers.

The invention will first be described and then will be particularly defined in the claim hereinafter set forth.

Reference is made to the accompanying drawings, forming part of this specification, and in which—

Figure 1 is a perspective view of an ordinary upright piano with the preferred duplex mirrors arranged thereon in accordance with my invention and with the player's hands indicated above the keyboard and partially reflected in one of the mirrors. Fig. 2 is a detail front perspective view of the outer end portion of one of the mirrors; and Fig. 3 is an enlarged vertical sectional view of one of the mirrors, taken on the line $x\,x$ in Fig. 1.

In carrying out this invention in a preferred manner a reflecting-mirror is arranged detachably at each end of a piano-case, and the mirrors are inclined outward from the vertical at their upper edges, and the mirrors also are adjustable backward and forward. Each mirror 1 is preferably arranged to slide in grooves 2 of a suitable frame 3, which may be made of metal, wood, or any other suitable materials. To the back of this frame is fastened an angular arm or bracket 4, which is fitted with any approved clamping device, such as a screw 5. This screw is preferably provided at its head 6 with a facing 7, of felt or other soft material, preventing defacement of the piano-case, side arm, or bracket 8 when the screw-head is forced against the arm to secure the mirror thereto in operative position. Each mirror preferably has a finger-knob 9, allowing it to be conveniently slid backward and forward in its frame 3 to assure full reflective view of the hands and forearms of either juvenile or adult players of the piano. Each end of the mirror-frame 3 may be provided with a button 10, which may be turned to overlap the adjacent end of the mirror to hold said mirror safely to or in its frame 3 when out of use. A partial reflection of one hand of the player is indicated at 11 at the right-hand mirror in Fig. 1 of the drawings. The back of the mirror-frame 3 is beveled or inclined at the inner face to allow the mirror to incline outward from the vertical at its upper edge and, as more clearly shown in Fig. 3 of the drawings, in order to most conveniently reflect to the performer's eyes his hands or hands and forearms during manual playing of the instrument. I prefer to make the mirrors about eight inches high and fourteen inches long and to use two mirrors, one at each end of the piano-case, as shown in Fig. 1 of the drawings, to allow each hand and forearm of the performer to be studied in the mirrors by reflections from both sides, and thus enable the performer to avoid awkward and tiresome motions and also materially assist him or her in acquiring graceful, correct, and labor-saving movements and positions of the hands and arms while playing the piano.

It is obvious that the mirrors may be very quickly and conveniently placed in operative position on the piano for use during practice playing and that they may as quickly be re-removed when their use is not desired by experts.

My invention is not limited to mirror attachments for pianos, as one or more mirrors may be applied to other musical instruments to promote graceful and correct manual playing of them by the aid of hand and arm reflections in the mirror or mirrors, substantially as above set forth.

I claim as my invention—

The herein-described mirror attachment for pianos, comprising a frame 3, a mirror 1 adapted to slide in said frame, an arm 4 on the frame, and a clamping-screw 5 in said arm, substantially as specified.

MARION MÜHLENBRUCH STAHL.

Witnesses:
  SEWARD DAVIS,
  OLIVER WILLIAMS.